Patented May 27, 1952

2,598,174

UNITED STATES PATENT OFFICE 2,598,174

RESINS FROM CARBOXYALKYL ETHERS OF POLYHYDRIC ALCOHOLS

William M. Hutchinson, Bartlesville, Okla., assignor to Phillips Petroleum Company, a corporation of Delaware No Drawing. Application August 4, 1948,
Serial No. 42,542

14 Claims. (Cl. 260—78.3)

This invention relates to new thermosetting resins, namely the condensation products of the free acids of carboxyalkyl ethers of polyhydric alcohols. In one of its more specific aspects, it relates to the preparation of free acids of carboxyalkyl ethers of polyhydric alcohols wherein the alcohol contains at least 3 and not more than 6 carbon atoms per molecule, and one hydroxy group attached to each carbon atom.

Generally speaking, there are two broad classes of resins: natural and synthetic. Each of these two classes may be divided into two groupings which are thermosetting resins and thermoplastic resins. Natural resins are inflammable, amorphous products of secretion or disintegration, usually formed in special cavities of plants. Generally, these natural resins are insoluble in water, soluble in alcohol, fusible, and of conchoidal fracture. They are the oxidation or polymerization products of the terpenes and consist of mixtures of aromatic acids and esters.

A term similar to resin is "resinoid," which refers to substances resembling resins in their physical properties, but differing by having a heat-hardening character, i. e., changing from a soluble and fusible solid to an insoluble and infusible solid on heating. In other words, they are thermosetting.

Thermoplastic resins are of a class which soften on heating and which may be molded, extruded, or otherwise formed when thus softened. At normal conditions, particularly temperature, thermoplastic resins are hard, and rigid and may be machined. Examples of this type are resins of cellulose, vinyl polymers, and styrol resins.

Thermosetting resins, those resins with which this specification deals, are of a different type from thermoplastic resins. They have the particular property of undergoing a permanent physical and chemical change under the influence of heat. Typical examples of thermosetting resins are phenol-aldehyde resins which form heat-hardening plastics, and heat-hardening coatings, in addition to oil soluble mixtures used with drying oils in making paints, varnishes, enamels, and nitrocellulose lacquers; polyhydric alcohol-phthalic anhydride esters, used in the hardened forms principally for electrical insulation, but also as a cement; and urea-formaldehyde resins or mixtures thereof employed in molding.

The use of thermosetting resins has increased in magnitude in the last few years until everyone is familiar with them in one form or another. Their performance, weather resistance, strength, hardness and ease of machining or hot forming gives them permanence in the home and in industry.

Specifically, this invention pertains to a new type of synthetic thermosetting resin. The principal motive in creating synthetic resins is not so much to imitate the natural products, as to improve on them. As versatile and useful as the natural resins are, there is not one that is entirely perfect, and all of them have faults which should be eliminated. Then too, the day must be faced when a supply of natural resins will be exhausted; and even before that, the time when the best specimens are gone and only inferior grades remain. The search is now under way for resins more versatile than any heretofore discovered and of properties not heretofore known.

An object of this invention is to provide a process for manufacturing resins.

Another object is to provide a process for manufacturing new synthetic resins.

Another object is to provide a method for manufacturing new thermosetting resins.

Another object is to make new resins from the free acids of carboxyalkyl ethers of polyhydric alcohols.

Another object is to provide new chemical compounds.

Another object is to provide new thermosetting resins.

Still further objects and advantages of my invention will be apparent to one skilled in the art from the accompanying disclosure and discussion.

I have discovered a process for manufacturing a new group of synthetic resins by the condensation of free acids of carboxyalkyl ethers of polyhydric alcohols of the general formula

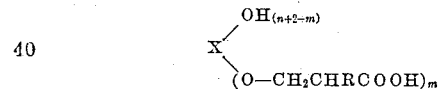

wherein X is a carbon chain the residual valences of which are satisfied by hydrogen, $m$ is 1 to $(n+1)$, and R is a hydrogen, a methyl group, or an ethyl group, and where the polyhydric alcohol from which the acid is derived is of the general formula

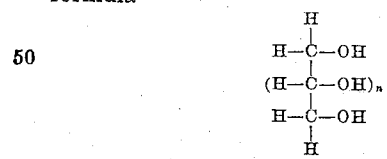

wherein $n$ is 1 to 4.

The following list of equations and brief discussion of one specific way of producing one of my resins are given to make more clear the mechanisms of my process. In this particular case the polyhydric alcohol used is glycerol and the nitrile is acrylonitrile. Equation 1 represents the reaction of glycerol with acrylonitrile over a strong base as catalyst wherein only one hydroxy-hydrogen of the glycerol is reacted with. The same general reaction takes place, of course, when more than one hydroxy-hydrogen is reacted with.

(1)

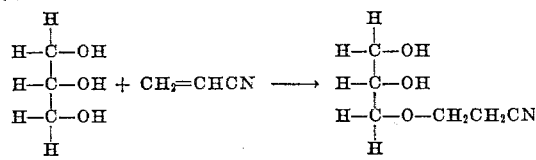

It is also possible for the nitrile to react with another hydroxy-hydrogen than the one indicated. Equation 2 shows the hydrolysis reaction as applied to the product of Equation 1. This reaction takes place by reacting the above product with an aqueous solution of an alkali metal hydroxide and produces the metal salt of the carboxyalkyl ether of glycerol.

(2)

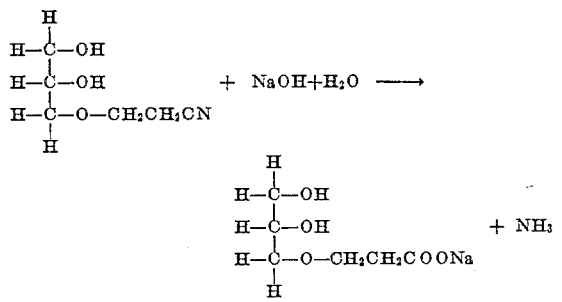

Equation 3, the last of the series, gives the means for producing the free acid of the carboxyalkyl ether of glycerol which comprises reacting the product of Equation 2 with dilute acid, in this case, hydrochloric acid.

(3)

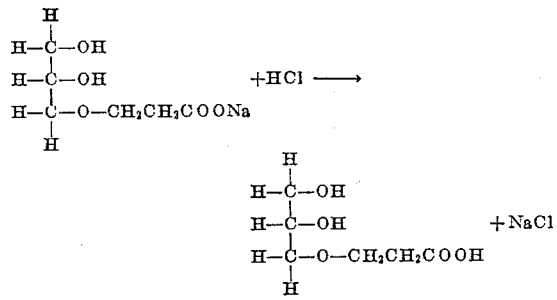

It is the product of Equation 3, the free acid of the carboxy-alkyl ether of glycerol, which is partially condensed to produce one of the thermosetting resins of my invention and which on complete condensation at an elevated temperature forms a thermoset resin.

In one embodiment of my invention, a suitable polyhydric alcohol and an unsaturated nitrile of the general formula $CH_2=CRCN$, in which R is either a hydrogen or an alkyl group containing not more than two carbon atoms, are reacted in the presence of a small amount of catalyst which may be a strong organic base such as a quaternary ammonium hydroxide, potassium hydroxide, sodium hydroxide, or the like. The resulting nitrile is hydrolyzed with an aqueous solution of an alkali metal hydroxide to produce the salt of the carboxyalkyl ether of the polyhydric alcohol. The mixture is then washed with aqueous ethanol and ether to precipitate the salt. Following the hydrolysis of the nitrile, the salt is neutralized with dilute acid (6 normal or less) to liberate the free acid of the carboxyalkyl ether. When so operating, any suitable acid, either organic or inorganic, having an ionization constant greater than $1\times10^{-3}$, can be used since the only reaction involved is one of neutralization. The neutralized product is then treated with aqueous alcohol or acetone to precipitate the thus formed free acid from the alkali metal salt, which is then separated. This free acid of the carboxyalkyl ether is then partially condensed in the presence of from about 0.5 to 5 per cent of a strong mineral acid such as hydrochloric acid, sulfuric acid, or ortho-phosphoric acid, at a concentration of from 6 to 18 normal, but preferably in the range of 8 to 12 normal, and heated at a temperature in the range of 25 to 100° C. for from 5 to 60 minutes. In this manner, condensation of the carboxy groups of one molecule with free hydroxy groups of other molecules is initiated and the product is ready for use as a thermosetting resin.

In another and often preferred embodiment of my invention, the salt of the carboxyalkyl ether of the polyhydric alcohol is treated with a mineral acid such as hydrochloric acid, sulfuric acid, or ortho-phosphoric acid having a concentration of from 6 normal to 18 normal, but preferably about 8 to 12 normal, to neutralize the base and liberate the free acid of the carboxyalkyl ether. Following neutralization, the mixture is treated with a further portion of strong acid, or in the instance of hydrochloric acid, with dry hydrogen chloride, to adjust the system to an acidity corresponding to that of from 6 to 18 normal. This mixture is then heated at 25 to 100° C. for from 5 to 60 minutes to institute partial condensation and to provide a product useful as a thermosetting resin and similar to that described in the above embodiment. After such heating, the mixture may be washed with aqueous alcohol or acetone to remove the alkali metal salt formed when acid was added to the salt of the carboxyalkyl ether of the polyhydric alcohol.

In its application, the product obtained by either embodiment is heated from 150 to 300° C. until converted into the final hard, infusible plastic. The time for such transformation will vary depending upon the temperature and the nature of the product desired, but will generally be in the range of from 0.1 to 0.5 hours.

The resins of my invention may have certain additional materials incorporated with them to alter or improve their properties or to make them more easily molded. Among these materials which may be added are fillers, such as finely divided wood flour, cotton flock, mica, and asbestos; coloring materials (usually pigments); thinners which will enable the formation of thin coatings for protection of such materials as metals; plasticizers, such as the conventional ester type to aid in adapting the resins to different uses or to impart in them somewhat different properties; and small amounts of other materials which may complete or hasten curing. Quantities of filler amounting to as much as 40 to 45 per cent and even more may be added to my resin, along with coloring matter in amounts up to 5 per cent and greater, and mold lubricants in amounts up to 1 per cent or more.

The term alcohol residue as used in this application refers to that portion of the alcohol molecule comprising the carbon chain and the hydrogens and hydroxyl groups attached thereto.

Advantages of my invention are illustrated by the following examples. The reactants and their proportions, and other specific ingredients are presented as being typical and should not be construed to limit the invention unduly.

The process used in Example I is that of one preferred embodiment of the invention.

*Example I*

The sodium salt of a polysubstituted carboxyethyl mannitol ether was prepared by reacting 10 parts by weight of mannitol with 18 parts by weight of acrylonitrile in the presence of one part by weight of trimethyl benzyl ammonium hydroxide catalyst. Heat was evolved within a short time and the mixture became homogeneous. The mixture was then allowed to stand for 30 minutes. Fifty parts by weight of 30 per cent sodium hydroxide were then added with heating. After this mixture became homogeneous and substantially all of the evolved ammonia vapors had been allowed to escape, 200 parts of water were added and the sodium salt of polysubstituted carboxyethyl mannitol ether was precipitated with a mixture of ethanol and ether.

The sodium salt thus prepared was neutralized with dilute hydrochloric acid. The neutralized material was then treated with aqueous ethanol to precipitate the free acid from the alkali metal salt. After separation, the free acid was treated with 2 per cent of concentrated hydrochloric acid and evaporated to dryness. The resulting free acid of a polysubstituted carboxyethyl mannitol ether was heated on a hot plate and partially condensed to a rubbery mass, after which it hardened on further condensation to an infusible mass. Tests on this hardened resin showed it to be insoluble in alcohol, ether, acetone, and acetic acid.

*Example II*

The process of this example is that of another and often more preferred embodiment of my invention.

The sodium salt of a polysubstituted carboxyethyl mannitol ether was prepared by reacting 10 parts by weight of mannitol with 18 parts by weight of acrylonitrile in the presence of one part by weight of trimethyl benzyl ammonium hydroxide. Heat was evolved within a short time and the mixture became homogeneous. The mixture was then allowed to stand for 30 minutes. Fifty parts by weight of 30 per cent sodium hydroxide were then added with heating. The mixture was then cooled and treated with 75 parts by weight, an excess, of 12-normal hydrochloric acid. The resinous product was then evaporated to dryness and washed to remove sodium salts. The resulting resin when heated at 200° C. for ten minutes became plastic and hardened to an infusible mass having the same properties as the product of Example I.

The new chemical compounds which are products of my process as are disclosed in the specification and the claims are thermosetting resins, and are of particular advantage in the fields of molding, paints and varnishes, textile sizing, and the like. They are synthetic and therefore their production is not dependent on natural resinous materials. They may be produced in highly purified forms suitable for a multitude of uses.

Although my invention has been described and exemplified in terms of its preferred modifications, it is understood that various changes may be made without departing from the spirit and scope of the disclosure and of the claims.

I claim:

1. A process for the manufacture of a new group of resins which on heating soften and then set to infusible solids, which comprises partially condensing a compound, which compound is a free acid of a polysubstituted carboxyalkyl ether of a polyhydric alcohol, to a resinous mass in the presence of a strong mineral acid catalyst at a temperature in the range of 25° to 100° C., said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing from 2 to 4 carbon atoms.

2. A process for the manufacture of a new group of resins which on heating soften and then set to infusible solids, which comprises partially condensing a compound, which compound is a free acid of a polysubstituted carboxyalkyl ether of a polyhydric alcohol, to a resinous mass in the presence of 6 to 18 normal hydrochloric acid as catalyst at a temperature in the range of 25° to 100° C., said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing from 2 to 4 carbon atoms.

3. A process for the manufacture of a new group of resins which on heating soften and then set to infusible solids, which comprises partially condensing a compound, which compound is a free acid of a polysubstituted carboxyalkyl ether of a polyhydric alcohol, to a resinous mass in the presence of 0.5 to 5 per cent of 6 to 18 normal hydrochloric acid as catalyst at a temperature in the range of 25° to 100° C., for 5 to 60 minutes, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing from 2 to 4 carbon atoms.

4. A process for the manufacture of a new group of resins which on heating soften and then set to infusible solids, which comprises partially condensing a compound, which compound is a free acid of a polysubstituted carboxyalkyl ether of mannitol, to a resinous mass in the presence of 0.5 to 5 per cent of 8 to 12 normal hydrochloric acid at a temperature in the range of 25° to 100° C. for 5 to 60 minutes, each of said carboxyalkyl ether groups containing from 2 to 4 carbon atoms, and there being at least one free hydroxyl group in said compound.

5. A process for the manufacture of a new group of thermoset infusible resins, which comprises partially condensing a compound, which compound is a free acid of a polysubstituted carboxyalkyl ether of a polyhydric alcohol, by heating said compound and a strong mineral acid catalyst of 6 to 18 normality at a temperature in the range of 25° to 100° C. for a period of time in the range of 5 to 60 minutes, and then heating product of said partially condensing at a temperature in the range of 150° to 300° C. for a time sufficient to produce said thermoset infusible resin, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing from 2 to 4 carbon atoms.

6. A process for the manufacture of a new group of thermoset infusible resins, which comprises partially condensing a compound, which compound is a free acid of a polysubstituted carboxyalkyl ether of a polyhydric alcohol, by heating said compound and hydrochloric acid of 6 to 18 normality as catalyst at a temperature in the range of 25° to 100° C. for a period of time in the range of 5 to 60 minutes, and then heating product of said partially condensing at a temperature in the range of 150° to 300° C. for a period of time in the range of 0.1 to 0.5 hour so as to produce said thermoset infusible resins, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing from 2 to 4 carbon atoms.

7. A process for the manufacture of a new group of thermoset infusible resins, which comprises partially condensing a compound, which compound is a free acid of a polysubstituted carboxyalkyl ether of a polyhydric alcohol, by heating said compound and 0.5 to 5 per cent of 6 to 18 normal hydrochloric acid to dryness at a temperature in the range of 25° to 100° C., and then heating product of said partially condensing at a temperature in the range of 150° to 300° C. for a period of time in the range of 0.1 to 0.5 hour so as to produce said thermoset infusible resins, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing from 2 to 4 carbon atoms.

8. A process for the manufacture of a new group of thermoset infusible resins, which comprises partially condensing a compound, which compound is a free acid of a polysubstituted carboxyalkyl ether of mannitol, by heating said compound and 2 per cent of 12 normal hydrochloric acid to dryness at a temperature in the range of 25° to 100° C., and then heating said partially condensed compound at a temperature in the range of 150° to 300° C. for a period of time in the range of 0.1 to 0.5 hour so as to produce said thermoset infusible resins, each of said carboxyalkyl ether groups having from 2 to 4 carbon atoms, and there being at least one free hydroxyl group in said compound.

9. A resin, said resin being formed by partially condensing a compound, which compound is a free acid of a polysubstituted carboxyalkyl ether of a polyhydric alcohol, by heating said compound and a strong mineral acid of 6 to 18 normality as catalyst at a temperature in the range of 25° to 100° C. for 5 to 60 minutes, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing 2 to 4 carbon atoms, said resin being capable of being heat hardened into a thermoset infusible resin.

10. A resin, said resin being formed by partially condensing a compound, which compound is a free acid of a polysubstituted carboxyalkyl ether of a polyhydric alcohol, by heating said compound and hydrochloric acid of 6 to 18 normality as catalyst at a temperature in the range of 25° to 100° C. for 5 to 60 minutes, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing 2 to 4 carbon atoms, said resin being capable of being heat hardened into a thermoset infusible resin.

11. A resin, said resin being formed by partially condensing a compound, which compound is a free acid of a polysubstituted carboxyalkyl ether of mannitol, by heating to dryness said compound and 0.5 to 5 per cent hydrochloric acid of 8 to 12 normality at a temperature in the range of 25° to 100° C., each of said carboxyalkyl ether groups containing 2 to 4 carbon atoms, and there being at least one free hydroxyl group in said compound, said resin being capable of being heat hardened into a thermoset infusible resin.

12. A thermoset infusible resin, said resin being formed by partially condensing a compound, which compound is a free acid of a polysubstituted carboxyalkyl ether of a polyhydric alcohol, by heating said compound and a strong mineral acid of 6 to 18 normality as catalyst at a temperature in the range of 25° to 100° C. for a period of time in the range of 5 to 60 minutes, and then heating product of said partially condensing at a temperature in the range of 150° to 300° C. for a period of time in the range of 0.1 to 0.5 hour so as to produce said thermoset infusible resin, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing 2 to 4 carbon atoms.

13. A thermoset infusible resin, said resin being formed by partially condensing a compound, which compound is a free acid of a polysubstituted carboxyalkyl ether of a polyhydric alcohol, by heating to dryness said compound and 0.5 to 5 per cent hydrochloric acid of 6 to 18 normality at a temperature in the range of 25° to 100° C., and then heating product of said partially condensing at a temperature in the range of 150° to 300° C. for a period of time in the range of 0.1 to 0.5 hour so as to form said thermoset infusible resin, said compound containing 3 to 6 carbon atoms exclusive of substituent carboxyalkyl ether groups, each of said carbon atoms which is unsubstituted by carboxyalkyl ether groups having one hydroxyl group thereon and there being at least one such hydroxyl group in said compound, and each of said carboxyalkyl ether groups containing 2 to 4 carbon atoms.

14. A thermoset infusible resin, said resin being formed by partially condensing a compound, which compound is a free acid of a polysubstituted carboxyalkyl ether of mannitol, by heating to dryness said compound and 0.5 to 5 per cent hydrochloric acid of 8 to 12 normality at a temperature in the range of 25° to 100° C., and then heating said partially condensed compound at a temperature in the range of 150° to 300° C. for a period of time in the range of 0.1 to 0.5 hour so as to form said thermoset infusible resin, each of said carboxyalkyl ether groups containing 2 to 4 carbon atoms, and there being at least one free hydroxyl group in said compound, said thermoset infusible resin being insoluble in alcohol, ether, acetone, and acetic acid.

WILLIAM M. HUTCHINSON.

REFERENCES CITED

The following references are of record in the file of this patent:

UNITED STATES PATENTS

| Number | Name | Date |
|---|---|---|
| 2,311,534 | Gleason | Feb. 16, 1943 |
| 2,382,036 | Bruson | Aug. 14, 1945 |
| 2,437,905 | Bruson | Mar. 16, 1948 |
| 2,438,208 | Filachione et al. | Mar. 23, 1948 |

OTHER REFERENCES

Taylor, C., Reactions and Symbols of Carbon Compds. (Century Co.) 1930, p. 225.

Conant et al., The Chemistry of Organic Compds. (MacMillan) 1947, p. 239.